(12) United States Patent
Kim et al.

(10) Patent No.: US 9,615,715 B2
(45) Date of Patent: Apr. 11, 2017

(54) ROBOT CLEANER

(71) Applicant: LG ELECTRONICS INC., Seoul (KR)

(72) Inventors: Hwang Kim, Seoul (KR); Sungil Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/802,310

(22) Filed: Jul. 17, 2015

(65) Prior Publication Data

US 2016/0081525 A1   Mar. 24, 2016

(30) Foreign Application Priority Data

Sep. 23, 2014   (KR) .................. 10-2014-0126857

(51) Int. Cl.
| | |
|---|---|
| A47L 9/28 | (2006.01) |
| A47L 11/40 | (2006.01) |
| A47L 9/00 | (2006.01) |
| B60B 15/26 | (2006.01) |

(52) U.S. Cl.
CPC ........... A47L 11/4066 (2013.01); A47L 9/009 (2013.01); B60B 15/263 (2013.01); *A47L 2201/00* (2013.01); *B60B 2200/49* (2013.01)

(58) Field of Classification Search
CPC .. A47L 11/4066; A47L 9/009; A47L 2201/00; B60B 15/263; B60B 2200/49
See application file for complete search history.

(56) References Cited

U.S. PATENT DOCUMENTS

2008/0222837 A1* 9/2008 Kaffenberger ............ A47L 9/22
15/319

FOREIGN PATENT DOCUMENTS

| EP | 2574263 A2 | 4/2013 |
|---|---|---|
| EP | 2702915 A2 | 3/2014 |
| JP | 2008049072 A | 3/2008 |
| JP | 4234743 B2 | 3/2009 |
| KR | 1020110008351 A | 1/2011 |
| KR | 1020130035389 A | 4/2013 |

* cited by examiner

*Primary Examiner* — David Redding
(74) *Attorney, Agent, or Firm* — Dentons US LLP (57) ABSTRACT

A robot cleaner including a cleaner body, a dust suction unit and a dust collection unit attached to the cleaner body, and a driving device to move the cleaner body, wherein the driving device includes a power generation unit to generate power, a power transmission unit to transmit the power generated by the power generation unit to a wheel such that the wheel is rotated by the power transmitted from the power transmission unit, and wherein the wheel includes a wheel member connected to the power transmission unit, and a first member and a second member attached to an outer circumference of the wheel member such that the first member and the second member contact different floor surfaces.

18 Claims, 9 Drawing Sheets

ROBOT CLEANER

This application claims the benefit of Korean Patent Application No. 10-2014-0126857 filed on Sep. 23, 2014 which is hereby incorporated by reference as if fully set forth herein.

BACKGROUND OF THE INVENTION

Field of the Invention

The present invention relates to a robot cleaner, and more particularly to a robot cleaner that is capable of passing an obstacle.

Discussion of the Related Art

In general, a vacuum cleaner is an apparatus that suctions air containing foreign matter, such as dust, from the outside using an air suction device provided in a cleaner body of the vacuum cleaner to generate air suction force and then separates the foreign matter from the air to collect foreign matter.

The vacuum cleaner performing the above functions may be classified as a manual vacuum cleaner that is directly manipulated by a user or a robot cleaner that performs automatic cleaning without user manipulation.

Specifically, the robot cleaner is an apparatus that travels within a region to be cleaned to suction foreign matter, such as dust, from a floor. In other words, the robot cleaner automatically performs cleaning within a predetermined region. To this end, the robot cleaner includes a distance sensor to sense the distance from the robot cleaner to obstacles, such as furniture, office supplies, and walls, located within a region to be cleaned, and left and right wheels to move the robot cleaner. The left and right wheels are configured to be rotated by a left wheel motor and a right wheel motor, respectively. As the left wheel motor and the right wheel motor are rotated, the robot cleaner performs indoor cleaning while changing travel directions.

In addition, a suction nozzle to suction foreign matter from the floor is provided at the lower part of the robot cleaner. The suction nozzle includes a nozzle case unmovably fixed to the cleaner body of the robot cleaner, a suction port formed at the bottom of the nozzle case to suction foreign matter, and an agitator rotatably provided in the suction port to sweep foreign matter, such as dust, on the floor into the suction part.

Meanwhile, the robot cleaner further includes a caster configured to smoothly turn the robot cleaner in addition to the left and right wheel motor, which are electrically powered.

The conventional robot cleaner with the above-stated construction may not pass a door sill or obstacle having a narrow width.

Korean Patent Application Publication No. 10-2013-0035389 discloses a structure in which an auxiliary wheel and a main wheel are connected to each other via a rotary shaft in a state in which a gear assembly is disposed between the auxiliary wheel and the main wheel. In this disclosure, however, the obstacle may be caught in a gap defined between the auxiliary wheel and the main wheel. In addition, it is necessary to extend a rotary shaft such that the auxiliary wheel and the main wheel are connected to each other via the rotary shaft. That is, the structure is complicated.

SUMMARY OF THE INVENTION

Accordingly, the present invention is directed to a robot cleaner that substantially obviates one or more problems due to limitations and disadvantages of the related art.

An object of the present invention is to provide a robot cleaner that is capable of stably passing an obstacle.

Another object of the present invention is to provide a robot cleaner that is capable of continuously traveling without being stopped by an obstacle having a narrow width.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a robot cleaner includes a cleaner body, a dust suction unit and a dust collection unit mounted in the cleaner body, and a driving device configured to move the cleaner body, wherein the driving device includes a power generation unit configured to generate power, a power transmission unit configured to transmit the power generated by the power generation unit to a wheel, and the wheel rotated by the power transmitted from the power transmission unit, the wheel includes a wheel member connected to the power transmission unit, the wheel member being a single component, and a first member and a second member coupled to an outer circumference of the wheel member such that the first member and the second member contact different floors, and the first member and the second member are coupled to the wheel member.

The second member, the first member, and the power transmission unit may be disposed such that the second member, the first member, and the power transmission unit are gradually distant from a center of the cleaner body.

The wheel member may include a first coupling part, to which the first member is coupled, and a second coupling part, to which the second member is coupled, the second coupling part having a smaller diameter than the first coupling part.

The first coupling part and the second coupling part may be disposed abutting on each other.

The first coupling part and the second coupling part may be integrated.

The first member and the second member may be disposed overlapping each other or abutting on each other when viewed from above.

A step may be provided between the first coupling part and the second coupling part.

The second member may have a diameter less than that of the first member.

The second member may be provided with a plurality of space parts each having an empty space defined therein such that the second member can be easily deformed.

The second member may have a width greater than that of the first member.

The second member may be made of a more flexible member than the first member.

The power transmission unit may include a plurality of gears and a gear housing configured to receive the gears.

The gear housing may include a receiving unit configured to receive the power generation unit, and the receiving unit may be disposed at the same side as a side of the gear housing at which the wheel is mounted.

The gears may include a first gear configured to be rotated while being engaged with the power generation unit and a second gear configured to be rotated while being engaged with the wheel, and rotary shafts of the first gear and the second are parallel to each other.

The first member and the second member may be rotated at the same rotational speed.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the drawings, sizes and shapes of elements may be exaggerated for convenience and clarity of description. Also, terms specially defined in consideration of the construction and operation of the present invention may vary depending upon intentions of users or operators or usual practices. The definition of such terms must be made based on the disclosure of the present invention.

Figure 1:
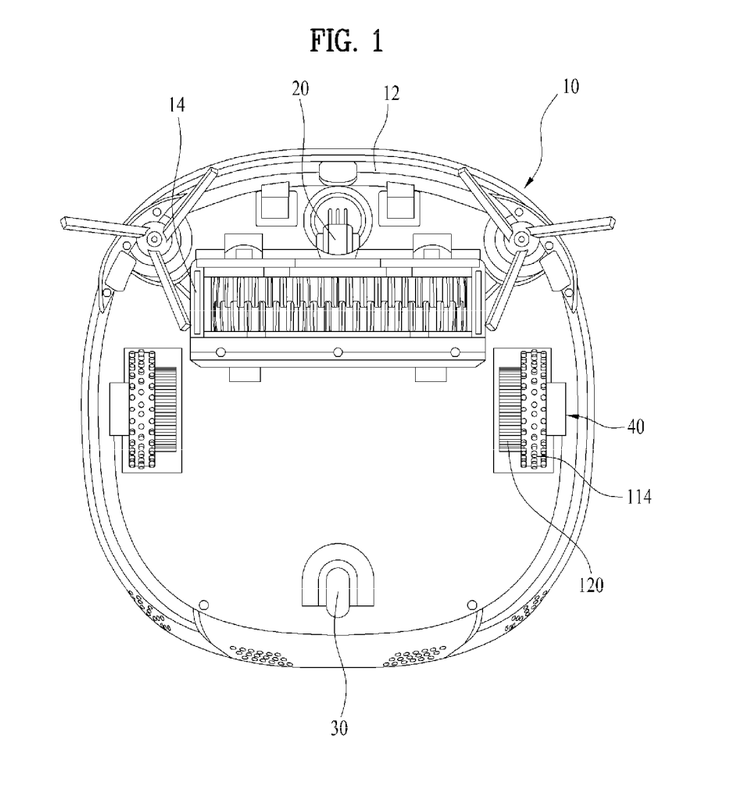
FIG. 1 is a view showing a lower part of a robot cleaner according to an embodiment of the present invention.

FIG. 1 is a view showing a lower part of a robot cleaner according to an embodiment of the present invention. Hereinafter, the robot cleaner according to the embodiment of the present invention will be described with reference to FIG. 1.

The robot cleaner according to the embodiment of the present invention includes a cleaner body 10 forming the external appearance of the robot cleaner, a dust suction unit and a dust collection unit mounted in the cleaner body 10, and a driving device 40 to move the cleaner body 10.

The dust suction unit may be mounted in the cleaner body 10 to provide suction force necessary to suction foreign matter, such as dust, from the outside.

The dust collection unit may be mounted in the cleaner body 10 to provide a space to collect the foreign matter, such as the dust, suctioned through the dust suction unit. When the foreign matter, such as the dust, is collected in the dust collection unit, a user may separate the dust collection unit from the cleaner body 10 to remove the foreign matter from the dust collection unit.

A wheel 100 to move the cleaner body 10 back and forth or to turn the cleaner body 10 may be provided at the lower part of the cleaner body 10. The wheel 100 is a component included in the driving device 40. The wheel 100 of the driving device 40 may be rotated to change a travel direction of the cleaner body 10 or to move the cleaner body 10 back and forth.

Meanwhile, the robot cleaner further includes a front auxiliary wheel 20 to support one side of the cleaner body 10 and to assist the movement of the cleaner body 10 performed by the wheel 100.

In this embodiment, wheels 100 may be independently provided at the left side and the right side of the cleaner body 10 such that the left side wheel and the right side wheel can be independently driven.

The cleaner body 10 may be provided with a suction unit 14 to suction foreign matter and an inclined part 12 to guide the cleaner body 10 when the cleaner body 10 goes up a step. The inclined part 12 may be a part formed at the lower end of one side of the front of the cleaner body 10 such that the inclined part 12 is inclined at a predetermined angle.

The suction unit 14 may include an agitator rotatably provided at the cleaner body 10 such that the agitator contacts a floor to be cleaned and a suction port formed at the cleaner body 10 to suction external foreign matter using suction force generated in the cleaner body 10.

The inclined part 12 is disposed at the forefront of the cleaner body 10, the front auxiliary wheel 20 is disposed at the rear of the inclined part 12, and the wheel 100 is disposed at the rear of the front auxiliary wheel 20.

Meanwhile, a rear auxiliary wheel 30 to support the other side of the cleaner body 10 may be provided at the rear of the wheel 100.

The front auxiliary wheel 20 and the rear auxiliary wheel 30 are provided such that the front auxiliary wheel 20 and the rear auxiliary wheel 30 can freely rotate with respect to the cleaner body 10 in a horizontal direction. The front auxiliary wheel 20 and the rear auxiliary wheel 30 are provided such that the heights of the front auxiliary wheel 20 and the rear auxiliary wheel 30 are fixed with respect to the cleaner body 10.

Meanwhile, the wheels 100 cannot rotate with respect to the cleaner body 10 in the horizontal direction. The wheels 100 are provided at the opposite sides of the cleaner body 10. The wheels 100 may rotate at different rotational speeds or in different rotational directions such that the cleaner body 10 can turn to the left or to the right.

Figure 2:
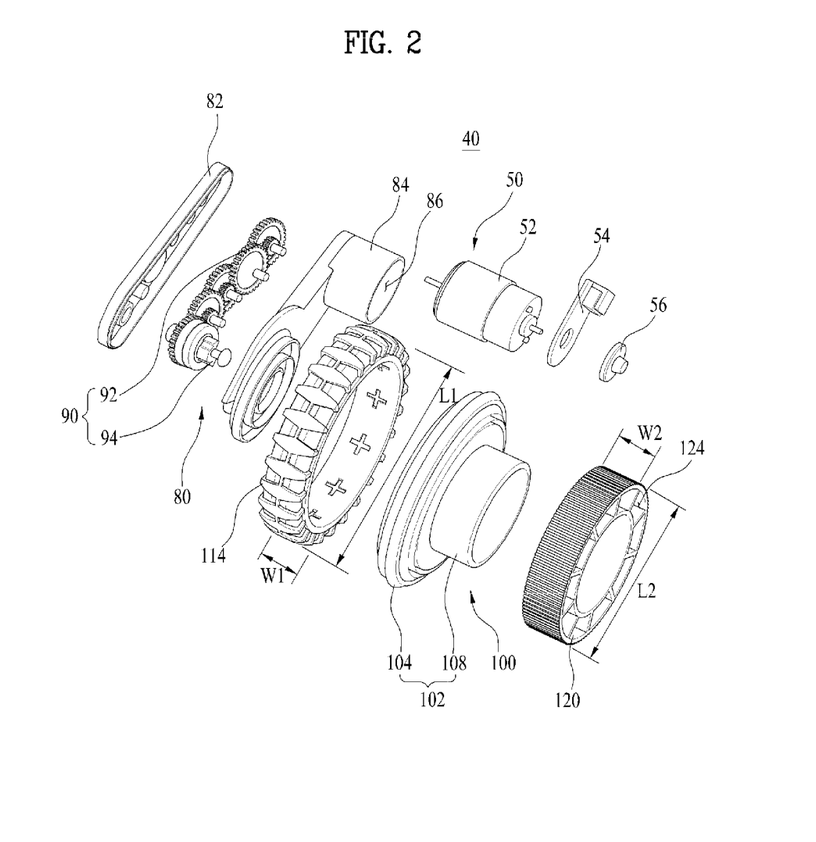
FIG. 2 is an exploded perspective view showing an important part of the robot cleaner according to the embodiment of the present invention.
Figure 3:
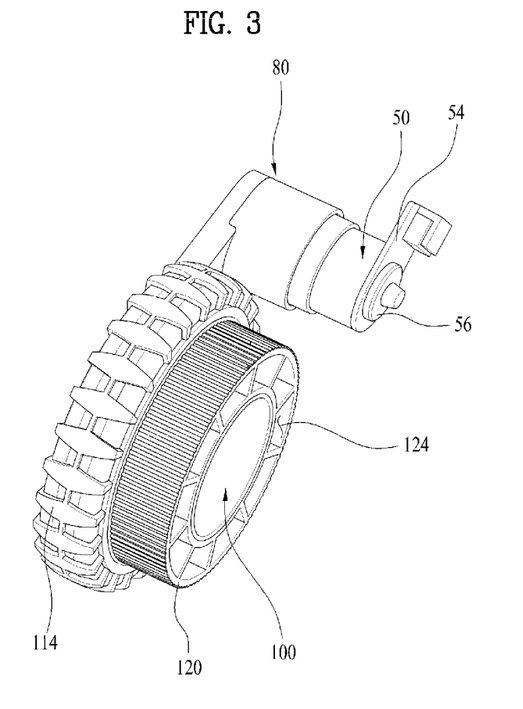
FIG. 3 is a view showing the important part of the robot cleaner of FIG. 2 in an assembled state.

FIG. 2 is an exploded perspective view showing an important part of the robot cleaner according to the embodiment of the present invention, and FIG. 3 is a view showing the important part of the robot cleaner of FIG. 2 in an assembled state. Hereinafter, the important part of the robot cleaner according to the embodiment of the present invention will be described with reference to FIGS. 2 and 3.

The driving device 40 may include a power generation unit 50 configured to generate power, a power transmission unit 80 configured to transmit the power generated by the power generation unit 50 to the wheel 100, and the wheel 100 rotated by the power transmitted from the power transmission unit 80.

Electricity from a battery mounted in the cleaner body 10 may be supplied to the power generation unit 50. The battery may be rechargeable using an external electric source.

The power generation unit 50 may include a driving motor 52 to generate a rotational force. The driving motor 52 may be driven by the electricity supplied by the battery. In this embodiment, driving motors 52 may be provided at the left side wheel and the right side wheel to drive the left side wheel and the right side wheel such that the left side wheel and the right side wheel can be rotated at different rotational speeds or in different rotational directions.

The power generation unit 50 may include a bracket 54 to fix one side of the driving motor 52. The bracket 54 may be provided with a through hole, through which a rotary shaft of the driving motor 52 extends.

The power generation unit 50 may be provided with an encoder 56 to sense the number of rotations of the driving motor 52. The encoder 56 may sense the number of rotations of the driving motor 52 and calculate the movement distance of the cleaner body 10 based on the sensed number of rotations of the driving motor 52. The bracket 54 and the encoder 56 of the power generation unit 50 may be modified in various shapes.

The power transmission unit 80 may transmit the power generated by the power generation unit 50 to the wheel 100.

The power transmission unit 80 may include a plurality of gears 90 and gear housings 82 and 84 configured to receive the gears 90.

The gears 90 may include a first gear 92 configured to be rotated while being engaged with the power generation unit 50 and a second gear 94 configured to be rotated while being engaged with the wheel 100. A plurality of other gears may be disposed between the first gear 92 and the second gear 94 to transmit a rotational force of the first gear 92 to the second gear 94.

Rotary shafts of the first gear 92 and the second gear 94 may be parallel to each other such that during rotation of the first gear 92, the second gear 94 can be rotated about the rotary shaft parallel to that of the first gear 92. The wheel 100 may also be rotated about a rotary shaft parallel to the rotary shafts of the first gear 92 and the second gear 94.

The gear housings 82 and 84 may include a first housing 82 disposed at one side of the gears 90 and a second housing 84 coupled to the first housing 82 to receive the gears 90. That is, the gears 90 may be received in a space defined by the first housing 82 and the second housing 84.

Meanwhile, the second housing 84 may be provided with a receiving unit 86 configured to receive a component of the power generation unit 50 configured to generate a rotational force, i.e. the driving motor 52. The rotary shaft of the driving motor 52 may be engaged with the first gear 92 in a state in which the driving motor 52 is received in the receiving unit 86 such that the rotational force generated by the driving motor 52 can be transmitted to the first gear 92.

The receiving unit 86 may be disposed at a side of the second housing 84 facing the center of the cleaner body 10.

In particular, the rotary shaft of the driving motor 52 may extend outward from opposite ends of driving motor 52 such that one end of the rotary shaft of the driving motor 52 can be engaged with the encoder 56, and the other end of the rotary shaft of the driving motor 52 can be engaged with the first gear 92.

The wheel 100 may include a wheel member 102 engaged with the power transmission unit 80, specifically the second gear 94, and a first member 114 and a second member 120 coupled to the outer circumference of the wheel member 102 such that the first member 114 and the second member 120 can selectively contact a floor.

The first member 114 and the second member 120 may contact different floors. The different floors may mean floors having different heights.

The first member 114 and the second member 120 may be different components coupled to the wheel member 102.

The wheel member 102 may be a single component, which may be manufactured by injection.

The wheel member 102 may include a first coupling part 104, to which the first member 114 is coupled, and a second coupling part 108, to which the second member 120 is coupled, the second coupling part 108 having a smaller diameter than the first coupling part 104. The first member 114 and the second member 120 may be configured as a single component.

Consequently, a rotational force of the second gear 94 may be simultaneously transmitted to the first member 114 and the second member 120 via the wheel member 102 in a state in which the wheel member 102 is engaged with the second gear 94.

In particular, the first coupling part 104 and the second coupling part 108 may be integrated. Since the first member 114 and the second member 120 are coupled to the wheel member 102, which is a single component, therefore, the first member 114 and the second member 120 may be rotated together during rotation of the wheel member 102 although the first member 114 and the second member 120 are not connected to each other via an additional power connection device.

The first coupling part 104 and the second coupling part 108 may be disposed abutting on each other. The first coupling part 104 and the second coupling part 108 may be disposed adjacent to each other such that another component is prevented from intruding into a space defined between the first coupling part 104 and the second coupling part 108. For example, in a case in which an obstacle has a small width, if there is a gap between the first coupling part 104 and the second coupling part 108, the obstacle may intrude into the gap. In the present invention, the first coupling part 104 and the second coupling part 108 are disposed abutting on each other to prevent the occurrence of such a problem.

In particular, when viewed from above, the first member 114 and the second member 120 may be disposed overlapping each other or abutting on each other. Consequently, an obstacle is prevented from intruding into a space defined between the first member 114 and the second member 120 and thus from disturbing travel of the robot cleaner. This is because if the obstacle intrudes into the space defined between the first member 114 and the second member 120, rotation of the first member 114 and the second member 120 may be disturbed.

Meanwhile, a diameter L2 of the second member 120 may be less than a diameter L1 of the first member 114. The second member 120 may have a diameter different from that of the first member 114 such that the second member 120 can easily contact an obstacle which it is difficult for the first member 114 to contact.

During a normal travel, therefore, the cleaner body 10 may travel in a state in which the first member 114, which has a relatively large diameter L1, is in contact with the floor. When the cleaner body 10 comes across an unusual obstacle, the cleaner body 10 may travel in a state in which the second member 120, which has a relatively small diameter L2, is in contact with the floor.

The first coupling part 104 may have a larger diameter than the second coupling part 108. The first member 114, which has a relatively large diameter, may be coupled to the first coupling part 104, and the second member 120, which has a relatively small diameter, may be coupled to the second coupling part 108.

For the wheel member 102, a step may be provided between the first coupling part 104 and the second coupling part 108. The first coupling part 104 and the second coupling part 108 are disposed adjacent to each other in a state in which the first coupling part 104 and the second coupling part 108 have different diameters. For this reason, the first coupling part 104 and the second coupling part 108 may not be connected to each other at a gentle inclination but a step having a surface bent perpendicular to a rotational central axis of the may be provided between the first coupling part 104 and the second coupling part 108.

The second member 120 may be provided with a plurality of space parts 124 each having an empty space defined therein such that the second member 120 can be easily deformed. The space parts 124 may be provided in the second member 120 such that the space parts 124 can be arranged along the outer circumference of the second member 120. When external force is applied to the second member 120, the space parts 124 may be deformed. For example, the space parts 124 may be compressed. As a result, a contact area between the second member 120 and the floor is increased, whereby it is possible to prevent sliding of the second member 120 on the floor during rotation of the second member 120.

In addition, the second member 120 may be made of a more flexible member than the first member 114. The second member 120 is configured to be more easily deformed than the first member 114 such that the contact area between the second member 120 and the floor is increased. In a case in which the second member 120 is made of a more flexible member than the first member 114, the cleaner body 10 may be more smoothly moved than the first member 114 due to contact between the second member 120 and the floor.

A width W2 of the second member 120 may be greater than a width W1 of the first member 114. In general, the cleaner body 10 is moved in a state in which the first member 114 is in contact with the floor. When the cleaner body 10 comes across an unusual obstacle, however, the cleaner body 10 is moved in a state in which the second member 120 is in contact with the obstacle or the floor instead of the first member 114. Since the width of the second member 120 is greater than that of the first member 114, the contact area between the second member 120 and the obstacle or the floor is increased, whereby it is possible for the cleaner body 10 to pass the obstacle.

Meanwhile, the second member 120, the first member 114, and the power transmission unit 80 may be disposed such that the second member 120, the first member 114, and the power transmission unit 80 are gradually distant from the center of the cleaner body 10. That is, the second member 120 may disposed closest to the center of the cleaner body 10, and the first member 114 and the power transmission unit 80 may be disposed distant from the center of the cleaner body 10.

Since the power transmission unit 80 is not disposed between the first member 114 and the second member 120 but is disposed at one side of an assembly constituted by coupling between the first member 114 and the second member 120, no gap is provided between the first member 114 and the second member 120. As a result, an obstacle is prevented from intruding into the space defined between first member 114 and the second member 120.

Meanwhile, the receiving unit 86 may be disposed at the same side as a side of the power transmission unit 80 at which the wheel 100 is mounted. That is, an engaged part between the first gear 92 and the driving motor 52 and an engaged part between the second gear 94 and the wheel member 102 may be disposed at the same side as the power transmission unit 80.

As a result, a space occupied by the driving device 40 in the cleaner body 10 may be reduced.

Figure 4:
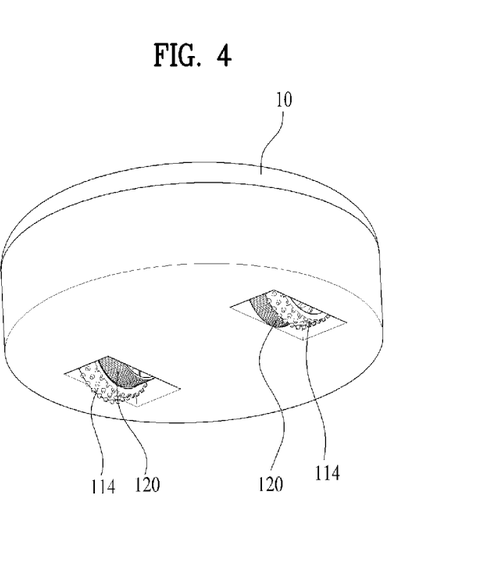
FIG. 4 is a perspective view showing the embodiment of the robot cleaner.

FIG. 4 is a perspective view showing the embodiment of the robot cleaner. Hereinafter, the embodiment of the robot cleaner will be described with reference to FIG. 4.

When the robot cleaner is viewed from below, the first member 114 and the second member 120 may be provided at the lower part of the cleaner body 10 in a state in which the first member 114 and the second member 120 are exposed outward such that the first member 114 and the second member 120 can selectively contact the floor.

The first member 114 and the second member 120 have different diameters. When the cleaner body 10 travels in a state in which the first member 114 is in contact with the floor, therefore, the second member 120 is rotated along with the first member 114 but does not contact the floor.

Figure 5A:
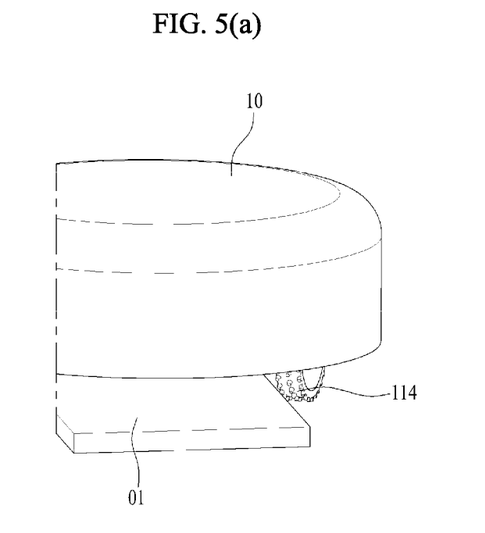
FIG. 5(a) is a view showing a conventional robot cleaner.
Figure 5B:
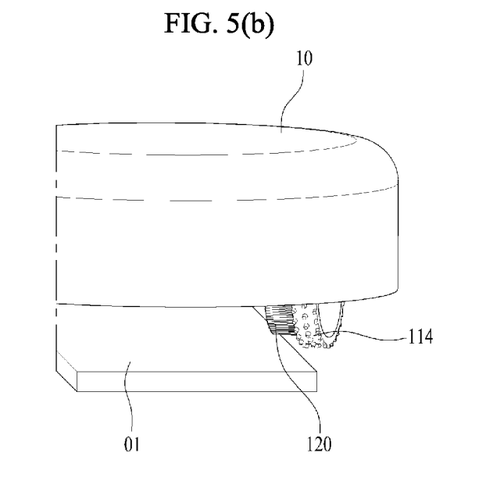
FIG. 5(b) is a view showing the robot cleaner according to the embodiment of the present invention.

FIGS. 5A and 5B are views showing a comparison between a conventional robot cleaner and the robot cleaner according to the embodiment of the present invention. Hereinafter, the robot cleaner according to the embodiment of the present invention will be described based on the comparison between the conventional robot cleaner and the robot cleaner according to the embodiment of the present invention with reference to FIGS. 5A and 5B.

FIG. 5(a) shows the conventional robot cleaner configured such that the wheel includes a component corresponding to the first member 114, and FIG. 5(b) shows the robot cleaner according to the embodiment of the present invention configured such that the wheel includes the first member 114 and the second member 120.

For example, when the conventional robot cleaner comes across an obstacle O1 as shown in FIG. 5(a), the component corresponding to the first member 114 must go up the obstacle O1 so as to pass the obstacle O1. In a case in which a rotational force of the component corresponding to the first member 114 is low or a contact area between the component corresponding to the first member 114 and the obstacle O1 is not sufficiently large, however, the cleaner body 10 may be stopped by the obstacle O1.

As the component corresponding to the first member 114 is rotated to some extent, the cleaner body 10 goes up the obstacle O1, whereby the bottom of the cleaner body 10 is placed on the obstacle O1. As a result, the component corresponding to the first member 114 is separated from the floor. In this case, the cleaner body 10 cannot be moved although the component corresponding to the first member 114 is rotated. Consequently, travel of the cleaner body 10 may be stopped in a state in which the cleaner body 10 is placed on the obstacle O1.

On the other hand, when the robot cleaner according to the embodiment of the present invention comes across the obstacle O1 as shown in FIG. 5(b), the first member 114 is rotated in a state in which the first member 114 is in contact with the floor. At this time, the second member 120 may be rotated in a state in which the second member 120 is in contact with the obstacle O1.

That is, the first member 114 and the second member 120 may be rotated together in a state in which the first member 114 and the second member 120 are in contact with the floor and the obstacle O1, respectively. When the cleaner body 10 comes across the obstacle O1, therefore, travel of the cleaner body 10 is not stopped.

In addition, when the bottom of the cleaner body 10 goes up the obstacle O1 due to rotation of the first member 114 in contact with the floor, the contact area between the second member 120 and the obstacle O1 is increased. As a result, the cleaner body 10 may be moved by a rotational force of the second member 120.

As described above, the first member 114 and the second member 120 are coupled to the wheel member 102, which is a single component. Consequently, it is possible to prevent the occurrence of a problem in a structure in which the rotational force is transmitted from the first member 114 and the second member 120 due to defects occurring in a component, to which the first member 114 and the second member 120 are connected.

Figure 6:
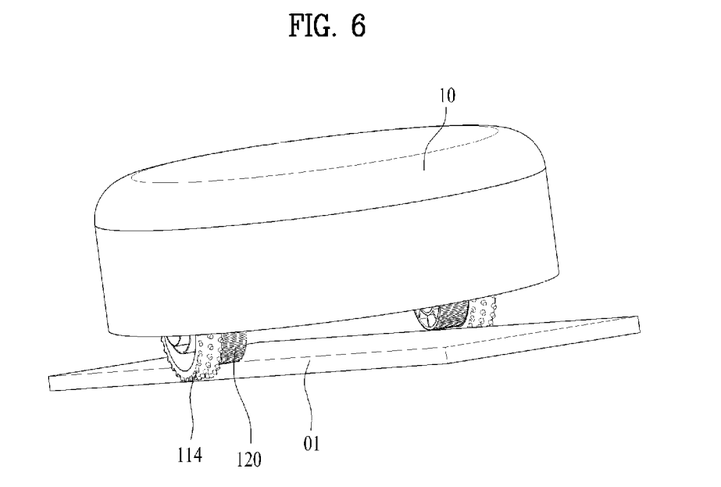
FIGS. 6 and 7 are views showing a state in which the robot cleaner passes an obstacle.
Figure 7:
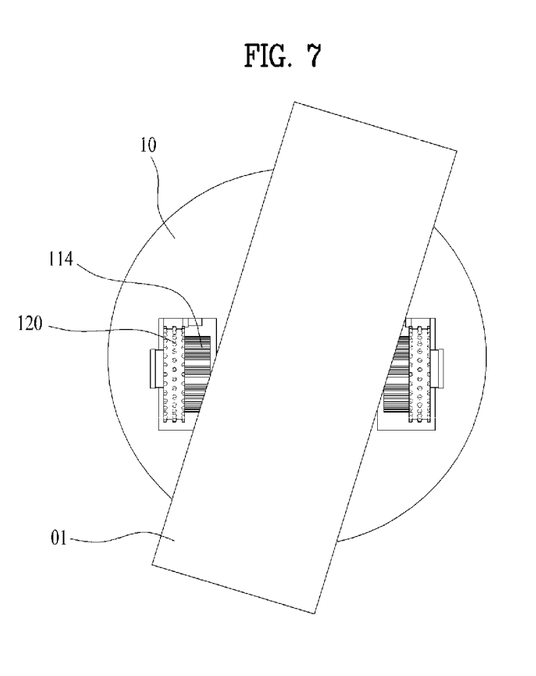

FIGS. 6 and 7 are views showing a state in which the robot cleaner passes the obstacle. Hereinafter, the robot cleaner passing the obstacle will be described with reference to FIGS. 6 and 7.

The obstacle O1 may have a shape similar to a door sill between rooms. The obstacle O1 may have a width less than that of the cleaner body 10. When the cleaner body 10 diagonally approaches the obstacle O1, therefore, two first members 114 may not simultaneously contact the obstacle O1.

That is, the obstacle O1 contacts the two first members 114 in a state as shown in FIG. 7. Consequently, the cleaner body 10 may be moved while passing the obstacle O1.

Figure 8:
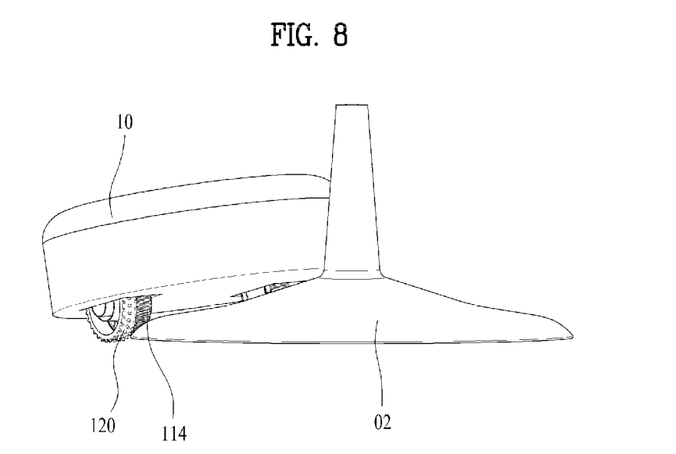
FIGS. 8 and 9 are views showing a state in which the robot cleaner passes another type of obstacle.
Figure 9:
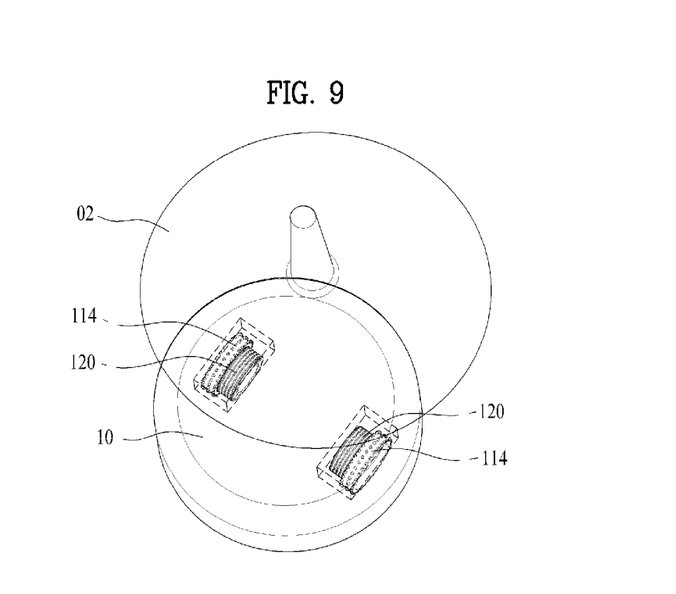

FIGS. 8 and 9 are views showing a state in which the robot cleaner passes another type of obstacle. Hereinafter, the robot cleaner passing the obstacle will be described with reference to FIGS. 8 and 9.

An obstacle O2 has a width greater than that of the obstacle O1. Since the cleaner body 10 does not directly approach the obstacle O2 but diagonally approaches the obstacle O2, however, the first member 114 disposed at one side of the cleaner body 10 contacts the obstacle O2, but the first member 114 disposed at the other side of the cleaner body 10 does not contact the obstacle O2.

That is, the first member 114 does not contact the obstacle O2 but the second member 120 contacts the obstacle O2 at the other side of the cleaner body 10. Consequently, the cleaner body 10 may continuously travel without being stopped by the obstacle O2.

As is apparent from the above description, the present invention has the effect in that the robot cleaner is capable of stably passing an obstacle.

In particular, the present invention has the effect in that the robot cleaner is capable of stably passing an obstacle having a narrow width in a state in which only one of the wheels contacts the obstacle or the obstacle is placed under the bottom of the cleaner body The present invention has the effect in that the wheels may be applicable to conventional robot cleaners without major change in design, whereby it is possible to reduce cost incurred to modify the conventional robot cleaners.

In addition, the present invention has the effect in that it is possible for the robot cleaner to perform cleaning without being stopped by an obstacle.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A robot cleaner comprising:
a cleaner body;
a dust suction unit and a dust collection unit attached to the cleaner body; and
a driving device to move the cleaner body, wherein the driving device comprises:
a power generation unit to generate power;
a power transmission unit to transmit the power generated by the power generation unit to a wheel such that the wheel is rotated by the power transmitted from the power transmission unit, wherein the wheel comprises:
a wheel member connected to the power transmission unit; and
a first member and a second member attached to an outer circumference of the wheel member such that the first member and the second member contact different floor surfaces,
wherein the second member is more flexible than the first member.

2. The robot cleaner according to claim 1, wherein the second member, the first member, and the power transmission unit are disposed such that the second member is disposed closer to the center of the body than the first member and the power transmission unit, and the first member is disposed closer to the center of the cleaner body than the power transmission unit.

3. The robot cleaner according to claim 1, wherein the wheel member comprises a first coupling part to which the first member is attached, and a second coupling part to which the second member is attached, the second coupling part having a smaller diameter than the first coupling part.

4. The robot cleaner according to claim 3, wherein the first coupling part abuts the second coupling part.

5. The robot cleaner according to claim 4, wherein the first coupling part and the second coupling part are integrated as a single element.

6. The robot cleaner according to claim 4, wherein the first member and the second member overlap each other or abutting each other when viewed from above.

7. The robot cleaner according to claim 4, further comprising a step located between the first coupling part and the second coupling part.

8. The robot cleaner according to claim 1, wherein a diameter of the second member is less than that of the first member.

9. The robot cleaner according to claim 8, wherein the second member is provided with a plurality of space parts each having an empty space defined therein such that the second member can be deformed when an external force is applied to the second member.

10. The robot cleaner according to claim 1, wherein a width of the second member is greater than that of the first member.

11. The robot cleaner according to claim 1, wherein the power transmission unit comprises:
a plurality of gears; and
a gear housing to receive the gears, the gear housing comprises a receiving unit to receive the power generation unit, whereby the receiving unit is disposed at a side of the gear housing facing a center of the cleaner body.

12. The robot cleaner according to claim 11, wherein the receiving unit is disposed at the same side of the gear housing at which the wheel is attached.

13. The robot cleaner according to claim 12, wherein the gears comprise:
a first gear to be rotated by a first rotary shaft while being engaged with the power generation unit; and a second gear to be rotated by a second rotary shaft while being engaged with the wheel, whereby the first and second rotary shafts are parallel to each other.

14. The robot cleaner according to claim 1, wherein the first member and the second member are rotated at the same rotational speed.

15. A robot cleaner comprising:
a cleaner body;
a dust suction unit and a dust collection unit attached to the cleaner body; and
a driving device to move the cleaner body, wherein the driving device comprises:
a power generation unit to generate power;
a power transmission unit to transmit the power generated by the power generation unit to a wheel such that the wheel is rotated by the power transmitted from the power transmission unit, wherein the wheel comprises:
a wheel member connected to the power transmission unit; and
a first member and a second member attached to an outer circumference of the wheel member such that the first member and the second member contact different floor surfaces,
wherein the second member, the first member, and the power transmission unit are disposed such that the second member is disposed closer to the center of the body than the first member and the power transmission unit, and the first member is disposed closer to the center of the cleaner body than the power transmission unit.

16. The robot cleaner according to claim 15, wherein
the wheel has a right wheel and a left wheel and
the right wheel and the left wheel are symmetric each other to the center of the cleaner body.

17. The robot cleaner according to claim 15, wherein the power transmission unit comprises:
a plurality of gears; and
a gear housing to receive the gears, the gear housing comprises a receiving unit to receive the power generation unit, whereby the receiving unit is disposed at a side of the gear housing facing a center of the cleaner body, and
wherein the receiving unit is disposed at the same side of the gear housing at which the wheel is attached.

18. The robot cleaner according to claim 15, wherein the power transmission unit comprises:
a plurality of gear, and
wherein the gears comprise:
a first gear to be rotated by a first rotary shaft while being engaged with the power generation unit; and
a second gear to be rotated by a second rotary shaft while being engaged with the wheel, whereby the first and second rotary shafts are parallel to each other.

* * * * *